(12) United States Patent
Mashhour

(10) Patent No.: US 10,010,062 B2
(45) Date of Patent: *Jul. 3, 2018

(54) KNOT TYING TOOL

(71) Applicant: Amal Mashhour, Granada Hills, CA (US)

(72) Inventor: Amal Mashhour, Granada Hills, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/150,151

(22) Filed: May 9, 2016

(65) Prior Publication Data

US 2017/0027146 A1 Feb. 2, 2017

Related U.S. Application Data

(63) Continuation of application No. 14/458,160, filed on Aug. 12, 2014, now Pat. No. 9,332,745.

(60) Provisional application No. 61/962,301, filed on Aug. 13, 2013.

(51) Int. Cl.
*A01K 91/04* (2006.01)
*B65H 69/04* (2006.01)

(52) U.S. Cl.
CPC ............. *A01K 91/04* (2013.01); *B65H 69/04* (2013.01); *B65H 2701/355* (2013.01)

(58) Field of Classification Search
CPC ............. B65H 2701/30–2701/31; A01K 91/04
USPC ............................................ 289/1.2, 1.5, 17
See application file for complete search history.

(56) References Cited

U.S. PATENT DOCUMENTS

| | | |
|---|---|---|
| 2,934,369 A | 4/1960 | Figaszewski |
| 3,131,957 A | 5/1964 | Musto |
| 3,252,724 A | 5/1966 | Kearns |
| 3,476,423 A | 11/1969 | Kentfield |
| 3,581,486 A | 6/1971 | Dibble |
| 4,401,328 A | 8/1983 | Yamada et al. |
| 4,403,797 A | 9/1983 | Ragland, Jr. |
| 4,573,719 A | 3/1986 | Aldridge |
| 5,100,415 A | 3/1992 | Hayhurst |
| 5,133,723 A | 7/1992 | Li et al. |
| 5,163,946 A | 11/1992 | Li |
| 5,211,650 A | 5/1993 | Noda |
| 5,324,298 A | 6/1994 | Phillips et al. |
| 5,357,740 A | 10/1994 | Moreland |
| 5,454,821 A | 10/1995 | Harm et al. |
| 5,472,446 A | 12/1995 | De La Torre |
| 5,536,273 A | 7/1996 | Lehrer |
| 5,562,684 A | 10/1996 | Kammerer |
| 5,647,616 A | 7/1997 | Hamilton |

(Continued)

*Primary Examiner* — Shaun R Hurley
*Assistant Examiner* — Bao-Thieu L Nguyen
(74) *Attorney, Agent, or Firm* — Knobbe, Martens, Olson & Bear LLP

(57) ABSTRACT

A knot tying tool can include an elongated housing and an insert member. The housing can have first and second body portions having different outer cross-sections. A first chamber can extend within the housing with a slit that opens into the chamber. The insert member can also have a slit opening into a second chamber. The insert member can have an inner cylinder rotatable and movable within the first chamber. Rotation of the inner cylinder within the first chamber can move the knot tying tool between a locked and an unlocked position, the first and second slits being aligned in the unlocked position to allow a line to pass through the first and second slits into the second chamber.

20 Claims, 14 Drawing Sheets

(56) References Cited

U.S. PATENT DOCUMENTS

| | | |
|---|---|---|
| 5,716,368 A | 2/1998 | De La Torre et al. |
| 6,132,439 A | 10/2000 | Kontos |
| 6,200,329 B1 | 3/2001 | Fung et al. |
| 6,434,878 B1 | 8/2002 | Milton |
| 6,716,224 B2 | 4/2004 | Singhatat |
| 6,817,634 B2 | 11/2004 | Champion |
| 7,261,327 B1 | 8/2007 | Johnston |
| 7,309,086 B2 | 12/2007 | Carrier |
| 7,666,196 B1 | 2/2010 | Miles |
| 7,793,458 B2 | 9/2010 | Eisbrenner |
| 7,992,571 B2 | 8/2011 | Gross et al. |
| 8,511,721 B1 | 8/2013 | Farner et al. |
| 8,814,905 B2 | 8/2014 | Sengun et al. |
| 8,936,282 B1 | 1/2015 | Berdahl |
| 9,332,745 B2 * | 5/2016 | Mashhour .............. A01K 91/04 |
| 2006/0042147 A1 | 3/2006 | Jenkins |
| 2007/0182157 A1 | 8/2007 | Carrier |
| 2009/0044441 A1 | 2/2009 | Neal et al. |
| 2010/0156100 A1 | 6/2010 | Goldsmith |
| 2014/0167413 A1 | 6/2014 | Ross |
| 2014/0208630 A1 | 7/2014 | Pearcy |

\* cited by examiner

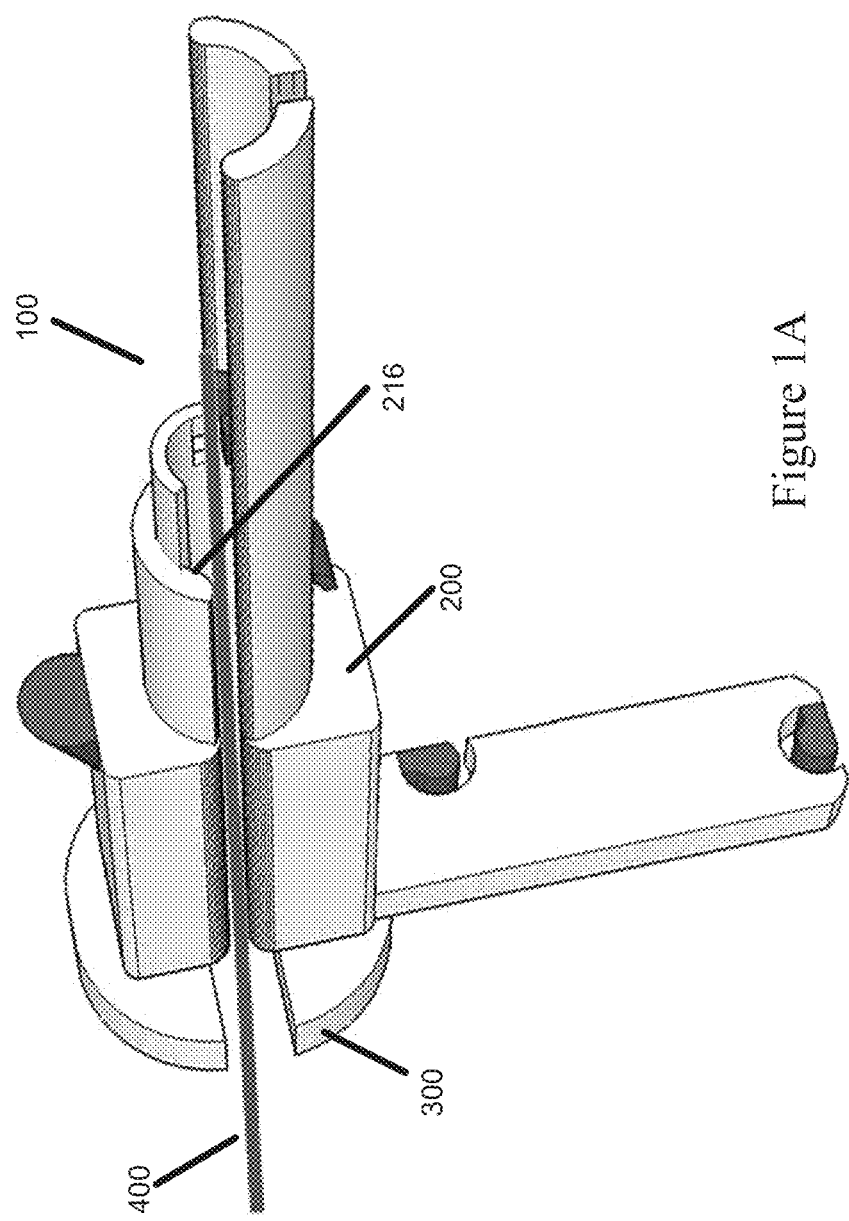

Figure 2C
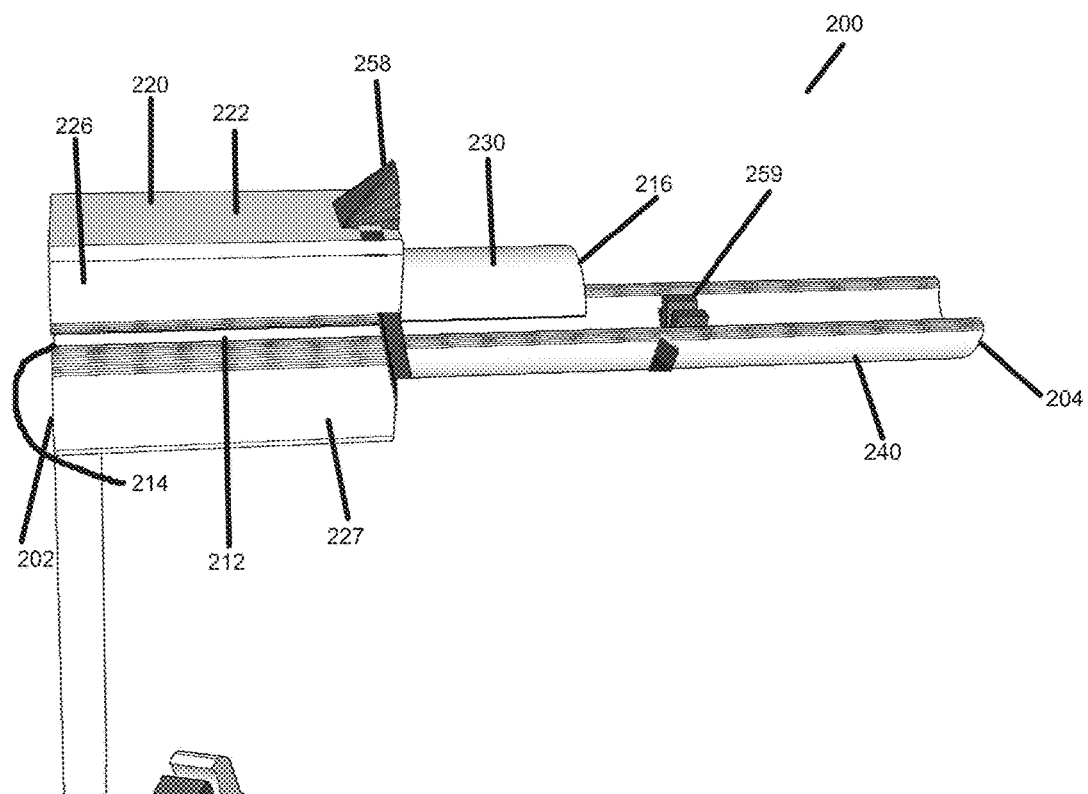
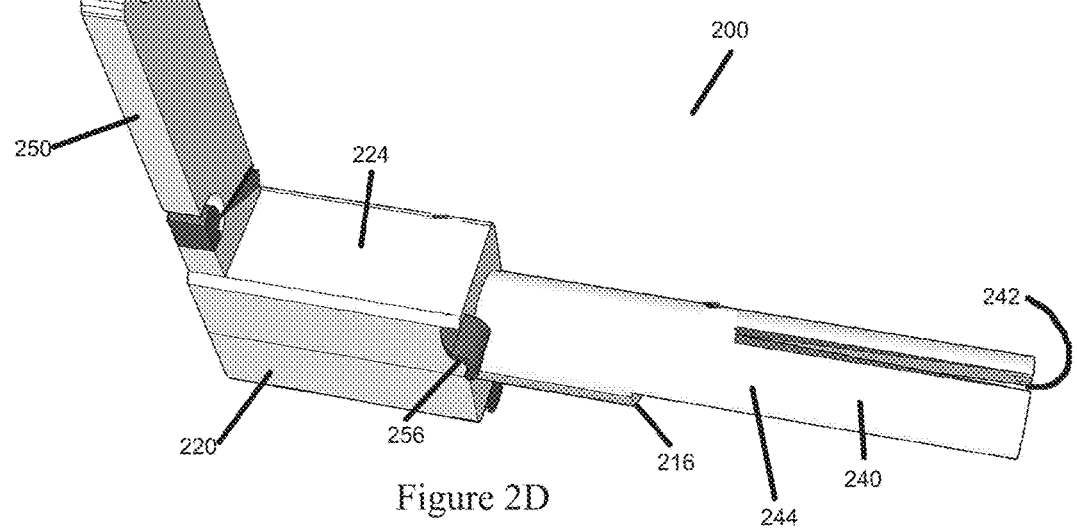
Figure 2D

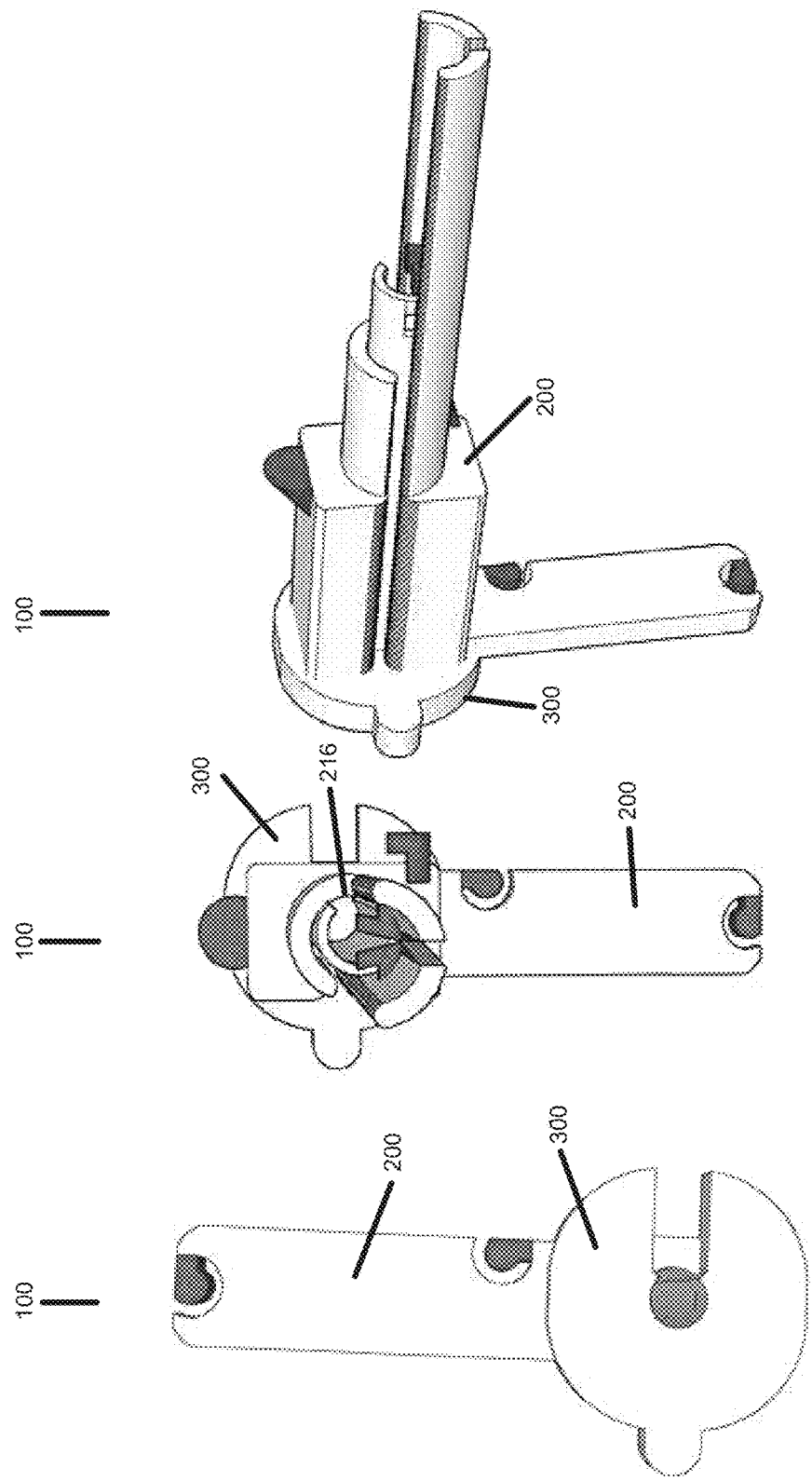

twist middle cylinder

KNOT TYING TOOL

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field of the Invention

This disclosure is related generally to a knot tying tool. In particular, devices and methods related to forming a knot around an item with a cord are disclosed.

Description of the Related Art

The need to form a knot in a cord arises in many different contexts. For example, fishing line must be secured tightly to a fishing hook so that the hook does not detach from the fishing line. Although a fisherman may be able to tie the requisite fishing knot from the comfort of his or her own home, external conditions can impair this important task. For instance, when attempting to tie a knot in a fishing line while on a boat, conditions such as wet hands, slippery lines, or a moving boat can make the task very difficult. The small width of the fishing line and of the loop on the hook through which the line is threaded further exacerbates the difficulties with tying the knot in any environment. This is merely one example in which forming a knot is necessary and of the difficulties associated with attempting to do so. Other contexts apply as well, such as sewing textiles where a thread must be secured to a needle, forming a knot with a suture in a medical context, repairing fabric, etc.

SUMMARY

Accordingly, there is in the need of the art for a tool and method for conveniently and simply forming a knot with a cord. A knot tying tool, such as THE KNOT MASTER (TKM), can provide such a solution. The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description of Certain Embodiments," one will understand how the features of the embodiments described herein provide advantages over existing devices and methods for forming a knot.

Tools and methods are disclosed for tying a knot. A knot tying tool can include an elongated housing and an insert member. The housing can have first and second body portions having different outer cross-sections. A first chamber can extend within the housing with a slit that opens into the chamber. The insert member can also have a slit opening into a second chamber. The insert member can have an inner cylinder rotatable and movable within the first chamber. Rotation of the inner cylinder within the first chamber can move the knot tying tool between a locked and an unlocked position, the first and second slits being aligned in the unlocked position to allow a line to pass through the first and second slits into the second chamber.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

FIGS. 1A-1B are perspective views of a knot tying tool.

FIGS. 2A-2D are perspective views of a first component or housing of the knot tying tool of FIGS. 1A-1B.

FIGS. 5A-5C are perspective views of the knot tying tool of FIGS. 1A-1B in a locked position.

DETAILED DESCRIPTION

The following detailed description is directed to certain specific embodiments of a knot tying tool. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but may not be requirements for other embodiments.

Embodiments of this disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the development. Furthermore, embodiments of the disclosure may include several novel features, no single one of which is solely responsible for its desirable attributes or which is essential to practicing the disclosure described herein.

Figure 1B:
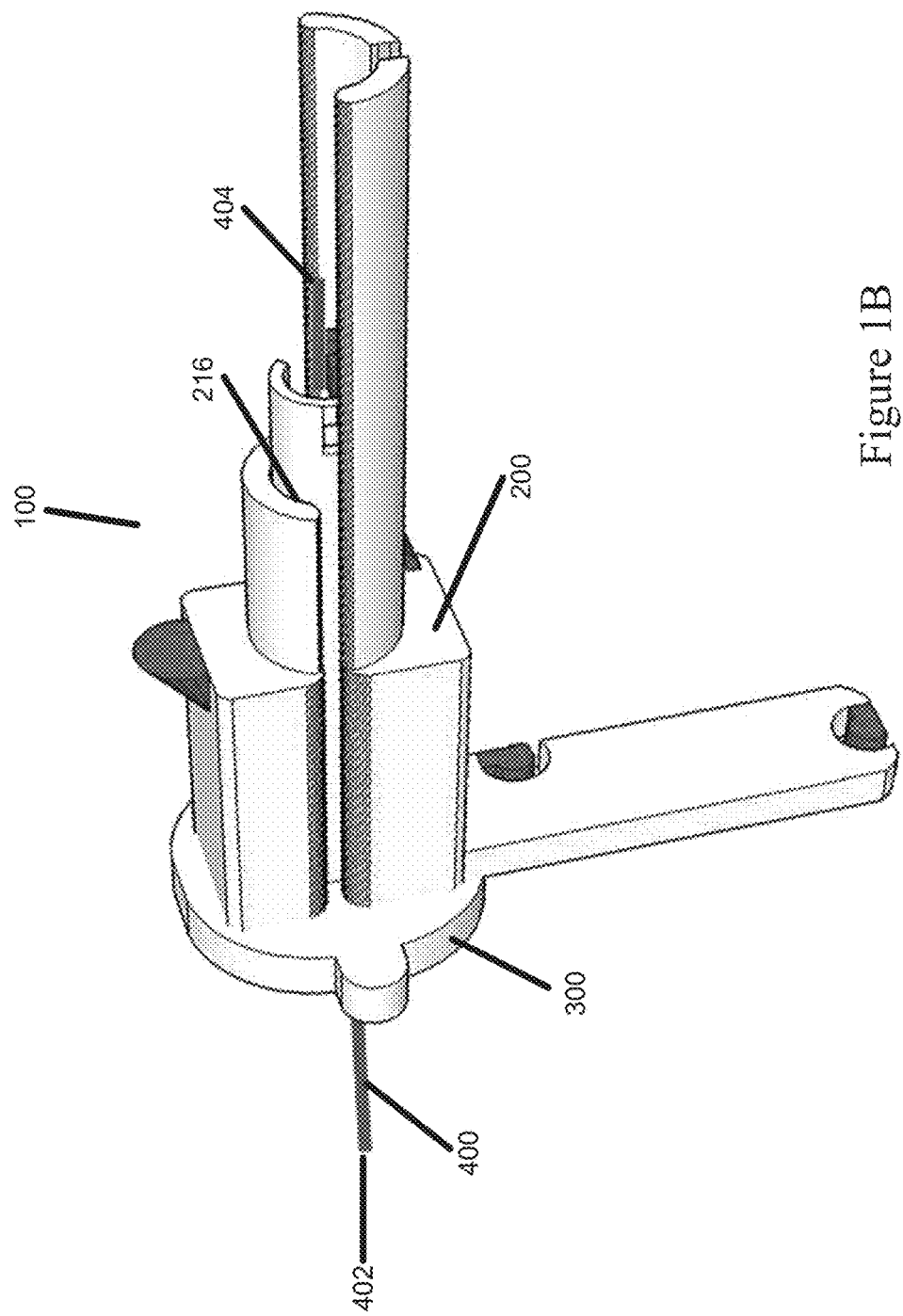

FIGS. 1A and 1B are perspective views of a knot tying tool 100 for forming a knot with a cord or line 400. The knot tying tool 100 may be used in many different contexts. For instance the knot tying tool 100 may be used for forming a knot around an item of interest. In some situations the item of interest is a fishing hook and the cord 400 is a fishing line. The knot tying tool 100 can be used to conveniently and easily tie a knot with the fishing line around the fishing hook. In addition, the tool 100 can be used to attach weights, lures, and/or additional line to the fishing line 400. The knot tying tool 100 and associated methods of using the knot tying tool 100 therefore provide a simple and convenient solution to securely forming a knot with the cord 400 and an item of interest.

In addition, the knot tying tool 100 can assist the user in forming a number of different knots. For example, a user may prefer to use different knots to attach different attachments (hooks, weights, lures, and/or additional line) to the line 400.

It is also appreciated that the knot tying tool 100 and associated methods of using the knot tying tool 100 may be used to form a knot in a cord 400 without an item of interest. The knot tying tool 100 may thus be used to form a knot in a cord 400. Therefore, the knot tying tool 100 has many different uses. Further, the use of the knot tying tool 100 to form a knot with a fishing line around a fishing hook is merely one context in which the knot tying tool 100 may be used. The knot tying tool 100 may be used in many other contexts as well.

As shown in FIGS. 1A and 1B, the knot tying tool 100 may comprise a number of different components. The different components can include a housing 200 and an insert member 300. These components are show individually in FIGS. 2A-D and 3A-C. In certain embodiments, the insert member 300 can be removed from the housing 200. In other embodiments, the insert member can move within the housing but is not removed therefrom.

As shown, the insert member 300 may be advanced into the housing 200. A cord 400 may be inserted through the insert member 300 and the housing 200. As shown in FIG. 1A, the insert member 300 is aligned with the housing 200 such that the cord 400 may be inserted through an end of the tool or through a side slit. The cord 400 may comprise a proximal end 402 and a distal end 404 (FIG. 1B).

FIG. 1B is a perspective view of the knot tying tool 100 including the housing 200, the insert member 300 and the cord 400. As shown, the insert member 300 has been rotated relative to its position as shown in FIG. 1A. In this configuration, the cord 400 is prevented from exiting the knot tying tool 100 through the side slit as the respective slits in the two components are no longer aligned. The knot tying tool 100 may be changed between the two configurations shown in FIGS. 1A and 1B by changing the relationship of the components, such as by rotating the insert member 300.

Figure 2A:
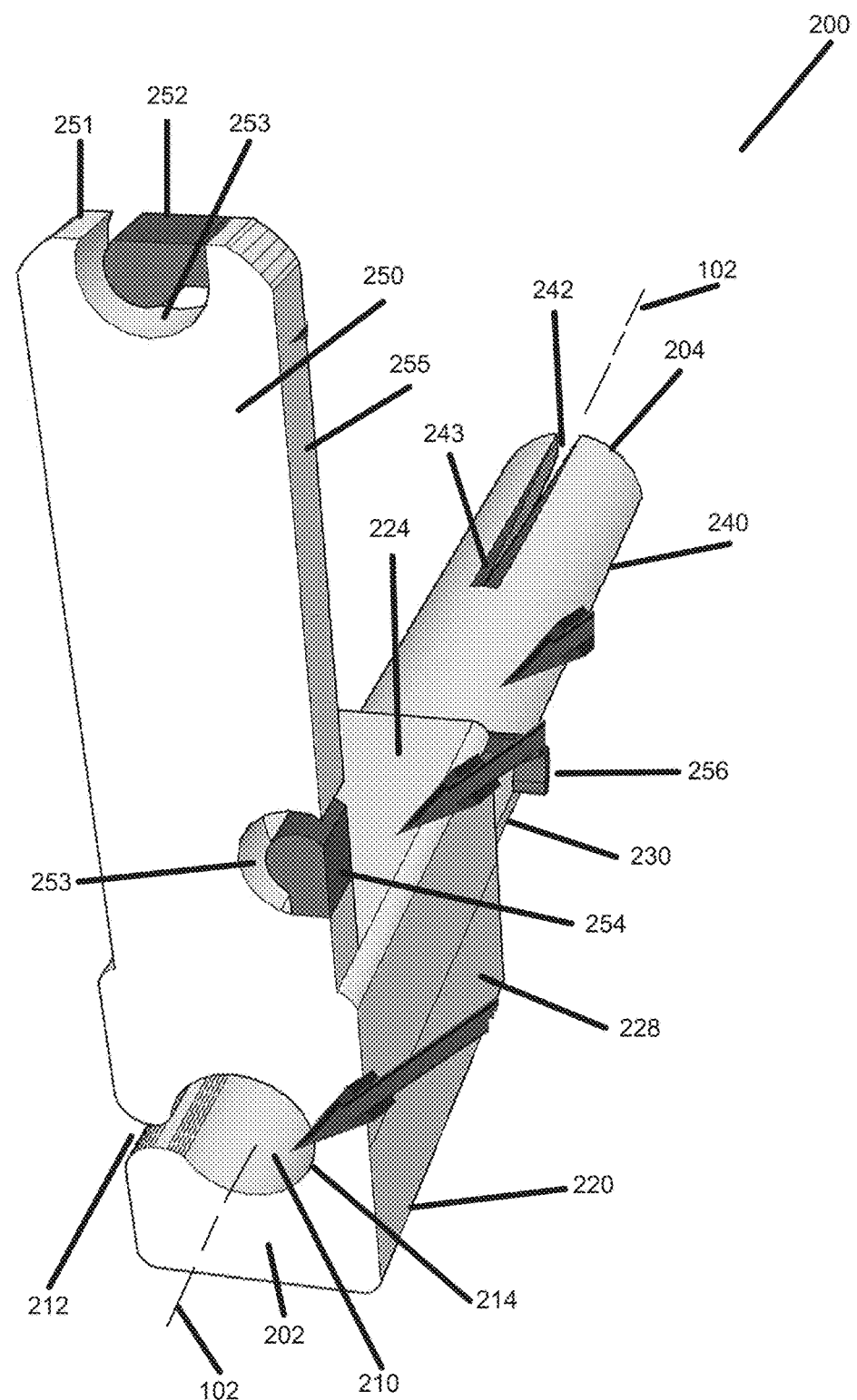
Figure 2B:
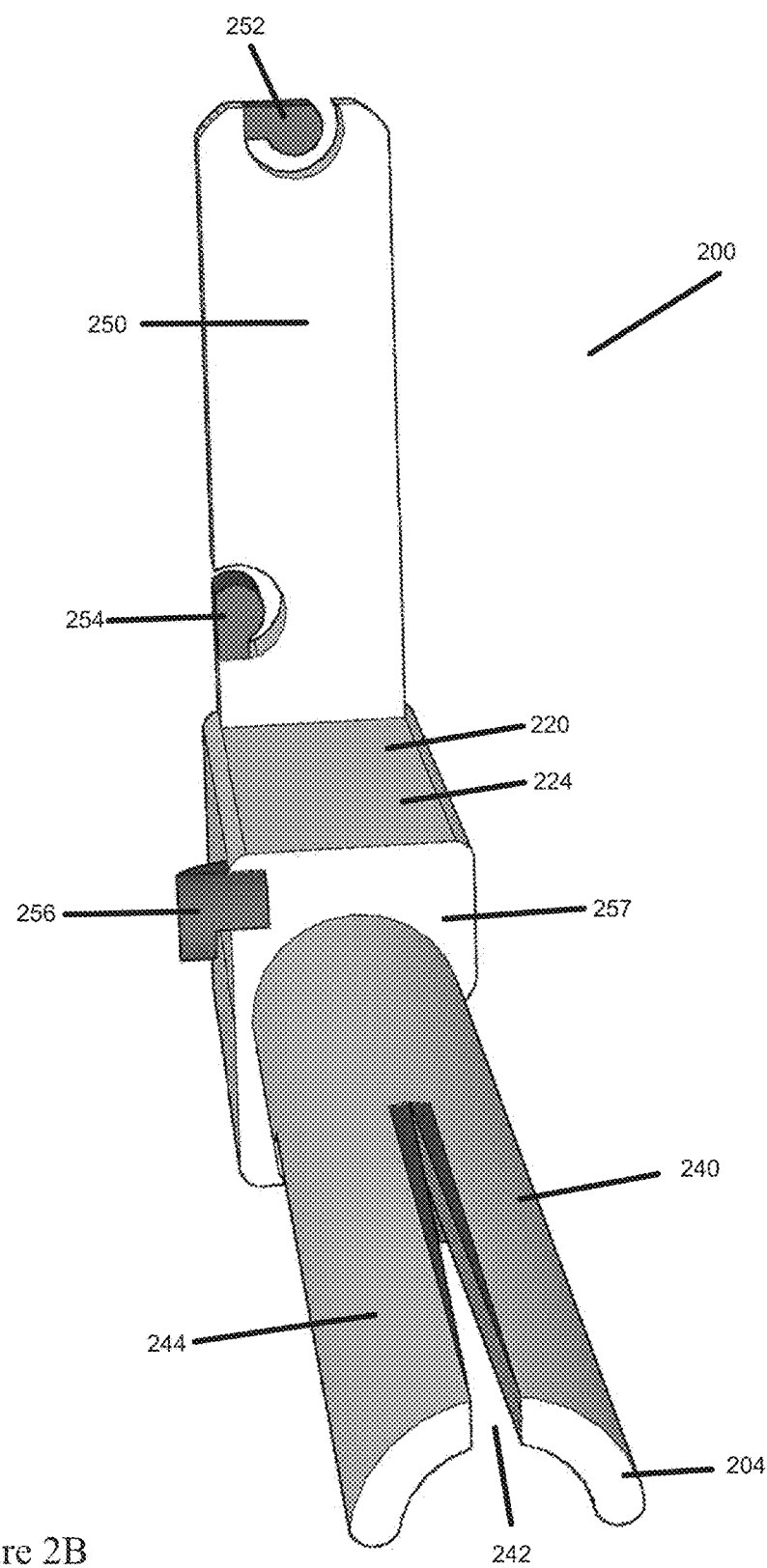

Looking now to FIGS. 2A-2D, various views of the housing 200 are shown and will be described. FIG. 2A is a rear, right, bottom perspective view of the housing 200. FIG. 2B is a front, bottom, left perspective view of the housing 200 from the rear, right and bottom. FIG. 2C is a right, top perspective view of the housing 200. FIG. 2D is a bottom, left, rear perspective view of the housing 200. The housing 200 and its associated features may be made from various materials. The housing 200 may be made from a metal, plastic, polymer, rubber, ceramic, glass, and/or combinations thereof. The housing 200 may be formed entirely of the same or similar material. In some embodiments, the housing 200 may be made from various different materials. For example, the housing 200 may be made from plastic as well as rubber. This is merely an example and other materials and combinations are possible. In some embodiments the tool and by co-molded of a first plastic material and a second softer, more flexible, and/or tacky material.

The housing 200 may include a proximal end 202 and a distal end 204. The housing 200 may be elongated from the proximal and 202 to the distal end 204. The proximal end 202 of the housing 200 may include a proximal opening 214. As shown, the proximal opening 214 is circular. In some embodiments, the proximal opening 214 may have a different shape. For example, the proximal opening 214 may be rounded but not circular, or it may be a different shape with flat sides, or combinations thereof.

The proximal opening 214 may be an opening of a first inner chamber 210. The first inner chamber 210 may be a hollow interior channel of the housing 200. The first inner chamber 210 may define a longitudinal axis 102. In some embodiments the first inner chamber 210 has a circular cross-section and the longitudinal axis 102 is at the center of the circular cross-section.

The first inner chamber 210 may extend from the proximal opening 214 to a distal opening 216. The distal opening 216 may have the same or a different shape as the proximal opening 214. As shown, the distal opening 216 has a circular shape. Therefore, in some embodiments, the first inner chamber 210 extends from the proximal opening 214 to the distal opening 216 and has a circular cross-section throughout.

The housing 200 may further comprise a main body or first portion 220. The first portion 220 may include the proximal opening 214. The first portion 220 may include a first portion of the first inner chamber 210. The housing 200 may further include a projection or second portion 230. The second portion 230 may extend from the first portion 220. The second portion 230 may include a second portion of the first inner chamber 210. Therefore the first inner chamber 210 may extend from a proximal opening 214 in the first portion 220 and terminate at the distal opening 216 at an end of the second portion 230. A change in outer shape between the first portion 220 and the second portion 230 can form a shoulder.

The housing 200 may further include a holder 240. The holder 240 may extend from the second portion 230 at the distal opening 216. The holder 240 may extend from the distal opening 216 to the distal end 204 of the housing 200. Therefore, in some embodiments, the distal end 204 of the housing 200 is on an end of the holder 240. The holder 240 has a generally rounded cross-sectional shape. By rounded, it is meant that the cross-sectional shape of the holder may be circular or other rounded shapes. As shown, the holder 240 has a semicircular cross-sectional shape.

The holder 240 may include features configured to hold or otherwise secure an item to the housing 200. As shown, the holder 240 includes a cut-out or slit 242. The cut-out 242 is partially at the distal end 204. The cut-out 242 is a cut-out formed by surfaces of the holder 240. The cut-out 242 can extend to and open at the end of the holder, though this is not required. In some embodiments, the cut-out 242 can pass through the holder, while not extending to the end.

As illustrated, the cut-out 242 is a wedge-shaped cut-out with the width being greatest at the distal end 204. The wedge-shaped cut-out 242 has a decreasing width in a direction along the longitudinal axis 102 away from the distal and 204. The wedge-shaped cut out 242 is shown as a "V" shape. However the cut-out 242 may have other shapes. Further, the wedge-shaped cut-out 242 is merely an embodiment of a feature configured to hold an item of interest. Other features and parts may be implemented to hold the item of interest. The cut-out 242 may formed from a rubber-like material, or may include a rubber-like insert or coating to facilitate with securing an item of interest to the housing 200. As shown, a rubber insert is located inside the cut-out 242. In some embodiments the cut-out 242 may include other materials. Rubber is merely one example and other suitable materials may be used.

The first portion 220 of the housing 200 is shown with a cross-sectional shape with an outer perimeter that is generally rectangular. The outer perimeter of the cross-section is defined by the outer surfaces of the first portion 220. The outer surfaces may include a top surface 222, a bottom surface 224, an upper right side surface 226, a lower right side surface 227, and a left side surface 228. A cross-section of the first portion 220 may also include a circular inner perimeter defined by the first inner chamber 210. Both the inner and outer perimeters may have different shapes then those shown, such as square or elliptical.

The second portion 230 of housing is shown with a cross-section having a generally rounded shape. Therefore, in some embodiments the second portion 230 has a cross-section with a rounded outer perimeter as well as a rounded inner perimeter defined by the first inner chamber 210.

The first 220 and second 230 portions have different shaped outer perimeters to their respective cross sections. This difference in shape and/or size between the two portions can be used to the advantage of the user when tying a knot, as will be explained below. However, in some embodiments the first portion 220 and the second portion 230 may have the same or similar shaped outer perimeters to their cross-sections. Further, the second portion 230 may have a similarly shaped cross-section as the holder 240. As shown the second portion 230 and the holder 240 share a surface 244 as best shown in FIGS. 2B and 2D. However, in some embodiments the second portion 230 and the holder 240 may not have the same or similarly-shaped shared surface 244.

The housing 200 may include a first slit 212. The first slit 212 may be formed by various surfaces of the housing 200. The first slit 212 may be formed by surfaces of the first portion 220 and the second portion 230. As shown, the first slit 212 runs or extends in a longitudinal direction along the first portion 220 and the second portion 230. The first slit also extends and connects to both the proximal opening 214 and to the distal opening 216 of the first inner chamber 210. The first slit 212 provides access to the first inner chamber 210. The first slit the 212 provides access to the first inner chamber 210 from the right side of the housing 200 as best shown in FIG. 2C. The first slit 212 is in between the upper right side surface 226 and the lower right side surface 227 of the first portion 220 and continues in a distal direction through the second portion 230.

The first slit 212 may run in a direction that is substantially parallel with the longitudinal axis 102. In some embodiments, the first slit 212 may run in a different direction or directions. Therefore, by "longitudinal" it is understood that this refers to a direction that is generally similar to but need not be precisely aligned with or parallel to the longitudinal axis 102. As shown, the first slit 212 extends from the proximal opening 214 to the distal opening 216. Therefore, the first slit 212 provides access to the entire length of the first inner chamber 210.

The housing 200 may further include a protrusion or lug 250. The lug 250 may extend from the housing 200 in a direction that is different from the direction along which the longitudinal axis 102 runs. In some embodiments the lug extends from the housing 200 in a direction that intersects the longitudinal axis 102. As shown, the lug 250 extends in a direction that is generally perpendicular to the longitudinal axis 102. In some embodiments, the lug 250 is not perpendicular to the longitudinal axis 102. For example, the lug 250 may extend from the housing 200 in a direction that is at an angle with the longitudinal axis 102 that is different from 90°. As shown, the lug 250 has a generally rectangular cross-sectional shape. The lug 250 maybe formed from the same or similar material as other parts of the housing 200, such as metal, plastic, etc.

The lug 250 extends from the proximal end 202 of the housing 200. However, the lug 250 may extend from other locations on the housing 200. In some embodiments, the lug 205 may extend from a more distal location of the first portion 220. In some embodiments, the lug 205 may extend from the second portion 230. Other suitable configurations are possible.

The housing 200 may include various features (termed here as "anchors") that 1) assist with securing the cord 400 and/or an item of interest or that 2) may be used to wrap the cord around. In some methods, the cord can wrap around an anchor, and a user's finger or thumb can hold the cord against the anchor. The housing 200 may include a first anchor 252, a second anchor 254, a third anchor 256, a fourth anchor 258 and a fifth anchor 259. In some embodiments the housing 200 may include fewer or more anchors. In some embodiments one or more anchor can also have a sharp edge that can be used to cut the line after tying the knot. The knot tying device may also have a separate sharp edge that can be used for this purpose.

As shown, the first anchor 252 is located near an end 251 of the lug 250. The first anchor 252, as well as any of the other anchors, may be formed from a rubber or rubberlike material. The anchors can be the same or a different material as the rest of the tool, such as plastic or metal. As shown in FIG. 2A, the first anchor 252 is a rubber extension in a notch 253 formed by surfaces at the end 251 of the lug 250. The cord 400 may be secured to the first anchor 252 by running the cord 400 in between the notch 253 of the lug 250 and the first anchor 252.

The second anchor 254 is located on a left side 255 of the lug 250. The second anchor 254 has a similar shape as the first anchor 252. However, the anchors need not have the same shape nor be made of the same material or materials. As shown, the lug 250 has a notch 253 in the left side 255 in which the second anchor 254 is located. The cord 400 may be secured at the second anchor 254 by running the cord 400 in between the notch 253 on the left side 255 of the lug 250 and the second anchor 254.

The third anchor 256 may be secured to the housing 200 at a location that is between or that spans the first portion 220 and the second portion 230. As shown, the third anchor 256 is coupled with an end surface 225 of the first portion 220. The third anchor 256 protrudes from the first portion 220 with a curved shape. The third anchor also has a cutout as best seen in FIG. 2B. The third anchor 256 has a rounded or hook like shape with one end of the third anchor 256 coupled with the housing 200. The cord 400 may be secured to the third anchored 256 by running the court 400 in between the third anchor 256 and the housing 200.

A fourth anchor 258 may be located on the first portion 220 of the housing 200. As shown and as best seen in FIG. 2C, the fourth anchor 258 may be located on the top surface 222 of the first portion 220. The fourth anchor 258 may be made of the same or similar materials as the other anchors. The fourth anchor 258 may therefore be made from rubber, however, other suitable materials may be used. The cord 400 may be secured to the fourth anchor 258 by wrapping the cord 400 around the fourth anchor 258. For example, the fourth anchor 258 may be a short nub on the housing 200, and the cord 400 may be secured to the fourth anchor 258 by wrapping the cord 400 around the nub. In some methods, a user's thumb can secure the cord wrapped around the fourth anchor 258.

A fifth anchor 259 may be located in or on the holder 240 of the housing 200. The fifth anchor 259 may facilitate securing the cord 400 and/or an item of interest to the housing 200. The fifth anchor 259 may therefore facilitate securing an item such as a fishing hook to the housing 200. The fifth anchor 259 may be formed from the same or similar materials as the other anchors. The fifth anchor 259 may therefore be a rubber or rubberlike material. As shown, the fifth anchor 259 may have a cross section with a semicircular shape. In some embodiments, the fifth anchor 259 may have a cross section with a generally rounded or "U" shape other than semicircular. The fifth anchor 259 may complement the inner perimeter of the cross section shape of the holder 240. The cord 400 or an item of interest may be secured to the fifth anchor 259 by pressing or otherwise placing the cord 404 or the item of interest in between the ends of the fifth anchor 259. The fifth anchor 259 may therefore surround or partially enclose the cord or item of interest, thereby securing it.

In some embodiments, the fifth anchor is part of or an extension of the cut-out 242. For example, a rubber-like material can form part of the cut-out while also forming the fifth anchor 259.

Figure 3C:
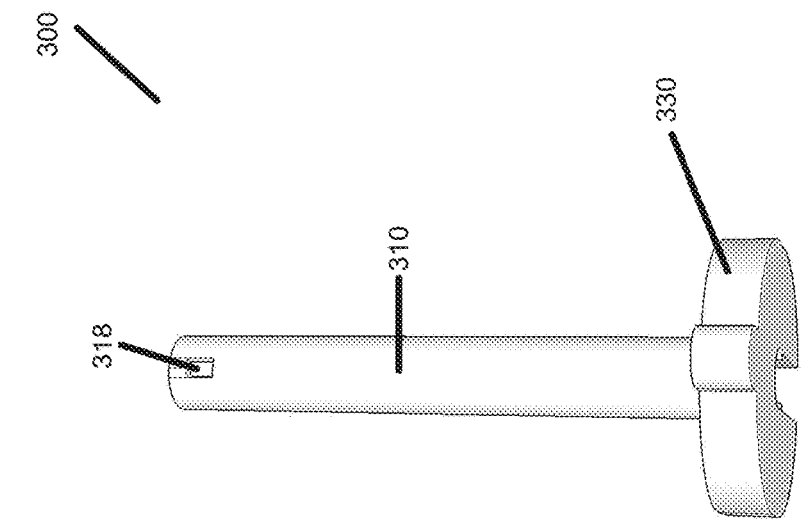
FIGS. 3A-3C are perspective views of second component or insert member of the knot tying tool of FIGS. 1A-1B.
Figure 3A:
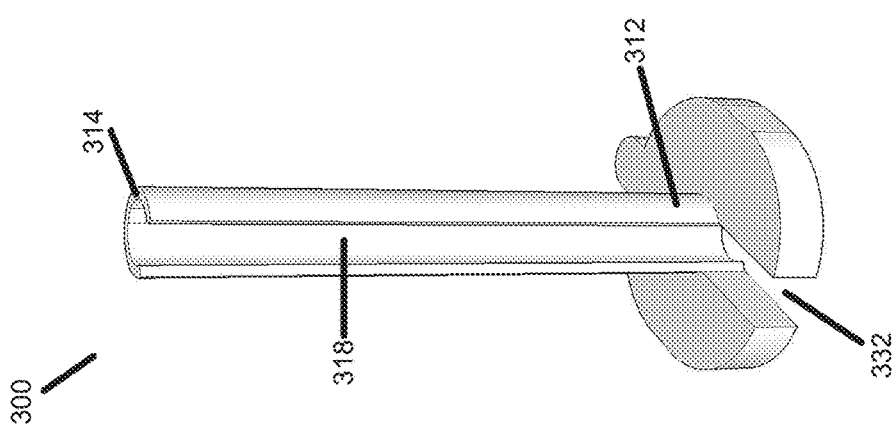
Figure 3B:
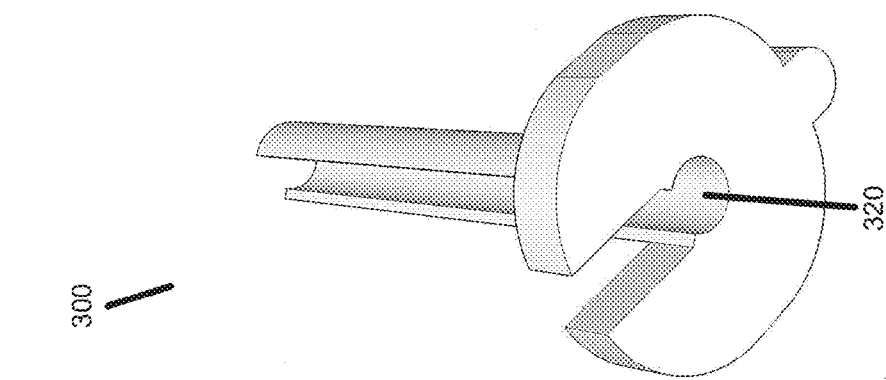

Moving now to FIGS. 3A-3C, various views of an embodiment of an insert member 300 will be described. FIG. 3A is a top side perspective view of the insert member 300. FIG. 3B is a bottom side perspective view of the insert member 300. FIG. 3C is another bottom side view of the insert member 300 where the insert member 300 has been rotated from its orientation in FIG. 3B. The insert member 300 can be used with the housing 200 in forming a knot in the cord 400. The insert member 300 can facilitate running the cord 400 through the knot tying tool 100 and/or removing a portion of the cord 400 from the housing 200.

As shown in FIGS. 3A through 3C, the insert member 300 includes an inner cylinder 310. The inner cylinder 310 is configured to be inserted into the first inner chamber 210 of the housing 200. As shown, the inner cylinder 310 is cylindrical having a cross-section that is circular. The inner cylinder 310 includes a proximal 312 and a distal 314 end. The inner cylinder 310 extends from the proximal end 312 to the distal end 314.

The insert member 300 may include a stop member 330. The stop number 330 may be located at the proximal end 312 of the inner cylinder 310. The stop member 330 has a width that is larger than the width of the inner cylinder 310. As shown, stop member 330 has a generally circular shape to its cross-section. The diameter of the circular stop member 330 may be larger than a width or diameter of the first inner chamber 210 of the housing 200. The stop member 330 also has a thickness. The stock number 330 is configured to limit the movement or translation of the insert member 300 inside the housing 200.

The inner cylinder 310 defines a second inner chamber 320. The second inner chamber 320 is a hollow channel or cavity on the inside of the inner cylinder 310. The second inner chamber 320 extends from the proximal end 312 to the distal end 314.

The insert member 300 may be made from a variety of materials. The insert member 300 may be made from a metal, a plastic, a polymer, rubber, glass, ceramic, and/or combinations thereof. The insert member 300 may be made from other suitable materials. Further, the insert member 300 may be the same material or materials as the housing 200. In some embodiments, the insert member 300 is made from materials that are different from those of the housing 200.

The insert member 300 may include a second slit 316. The second slit 316 may be formed or otherwise defined by the inner cylinder 310. The second slit 316 may run or otherwise extend from the proximal end 312 to the distal end 314. The second slit 316 is configured to align with the first slit 212 of the housing 200 when the insert member 300 is within the housing 200 (FIG. 1A). The width of the second slit 316 may be the same as the width of the first slit 212 of the housing 200. In some embodiments, the widths of the first slit 212 and the second slit 316 are different. For example, the second slit 316 may be wider or narrower than the width of the first slit 212.

The insert member 300 may further include a third slit 332. The third slit 332 may be formed from surfaces of the stop member 330 and/or surfaces of the inner cylinder 310. The third slit 332 is therefore an empty or hollow space in the insert member 300. In some embodiments the third slit 332 may align with the second slit 316. As shown, the third slit 332 aligns with the second slit 316 such that the cord 400 may be inserted into the second inner chamber 320 through the second slit 316 and through the third slit 332.

The insert member 300 may include an opening 318. As shown, the opening 318 may be in the inner cylinder 310. The opening 318 may be at and/or near the distal end 314 of the insert member 300. The opening 318 provides access to the second inner chamber 320 from outside the insert member 300, and vice versa. The opening 318 is shown as a generally rectangular cutout in the inner cylinder 310. In some embodiments, the opening 318 has a different shape. For example, the opening 318 may be circular or other shapes. As shown, the opening 318 is located on the inner cylinder 310 at a location opposite the second split 316. The insert member 300 may be rotated about a longitudinal axis defined by the second inner chamber 320 to expose either the second slit 316 or the cord retrieval opening 318.

The inner cylinder 310 can be sized such that the opening 318 is outside of the first inner chamber 210 when the insert member 300 is positioned fully within the first inner chamber. Thus, when the stop member is engaged with the proximal opening 214, the opening 318 on the inner cylinder can be spaced distally from the distal opening 216 of the housing. In some methods, an end 404 of a cord 400 can be passed through the opening 318. The insert member 300 can then be withdrawn from the housing 200. This can cause the end 404 of the cord to pass through portions of the cord 400 that have been wrapped around the housing 200. In addition, the different sizes and shapes of the first 220 and second 230 portions of the housing 200 can help to ensure that the cord stays in place while the end of the cord is pulled through the first inner chamber 210.

Figure 4A:
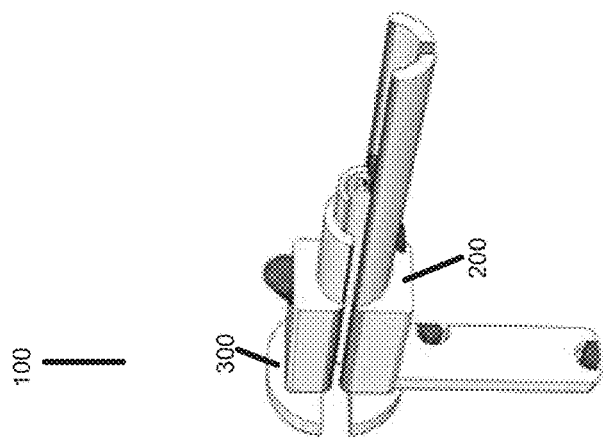
FIGS. 4A-4D are perspective views of the knot tying tool of FIGS. 1A-1B in an unlocked position.
Figure 4B:
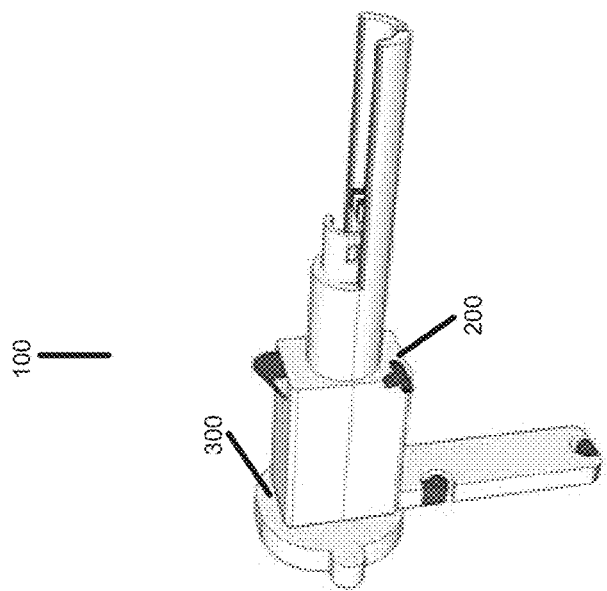
Figure 4C:
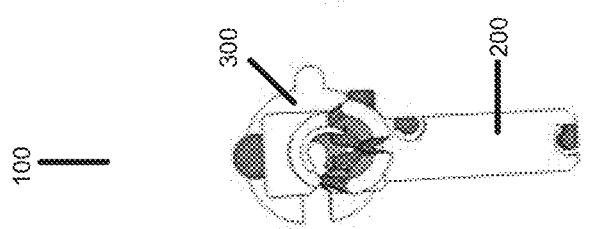
Figure 4D:
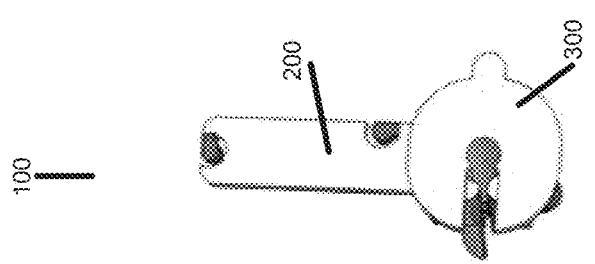
Figure 6A:
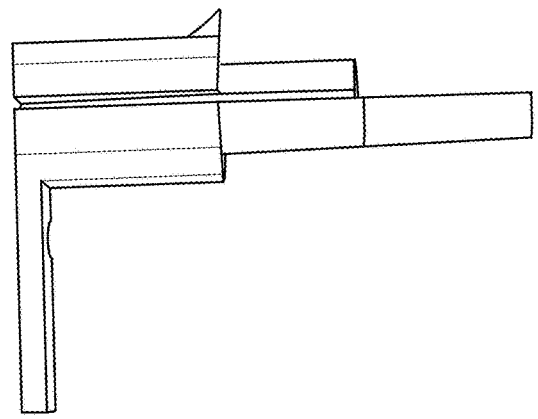
FIGS. 6A-6G illustrate] another embodiment of knot tying tool.
Figure 6B:
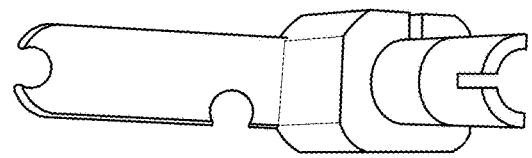
Figure 6C:
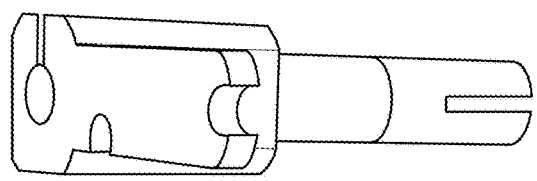
Figure 6D:
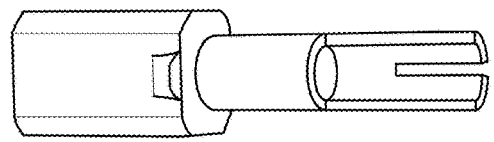
Figure 6E:
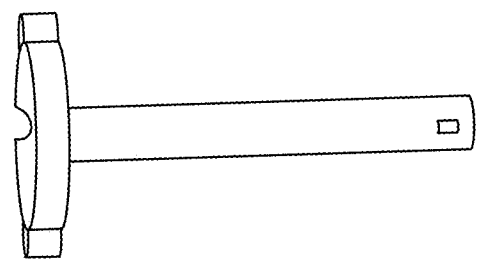
Figure 6F:
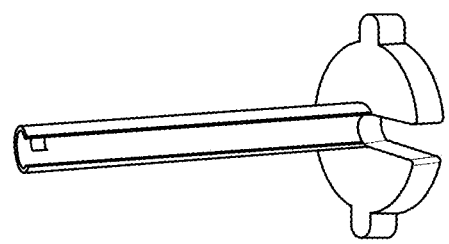
Figure 6G:
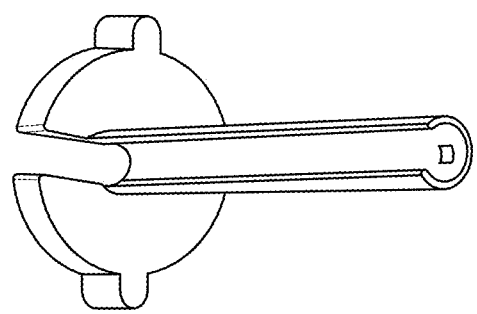

FIGS. 4A through 4D show various views of the knot tying tool 100. The knot tying tool is shown in these figures in an unlocked position. It will be noted that FIG. 4B shows a slightly different embodiment, also in an unlocked position. As shown, the insert member 300 has been inserted into the housing 200. The insert member 300 may be inserted by moving, translating, or otherwise positioning the inner cylinder 310 into the proximal opening 214 of the housing 200. The insert member 300 may be inserted into the housing 200 until the stop member 330 contacts the proximal end 202 of the housing 200. The insert member 300 may therefore slide within the housing 200. The insert member 300 may be translated into the housing 200 such that the opening 318 is located distally of the distal opening 216 of the housing 200. In this location, the opening 318 is outside of the first inner chamber 210 of the housing 200.

The insert member 300 may rotate within the housing 200. When the inner cylinder 310 is inside the first inner chamber 210, the insert member 300 may rotate. In some embodiments, the insert member 300 may rotate about the longitudinal axis 102. The knot tying tool 100 may be placed in an unlocked position by rotating the insert member 300 inside the housing 200 such that the second slit 316 of the insert member 300 is aligned with the first slit 212 of the housing 200. In this position, the second inner chamber 320 of the insert member 300 is accessible from the outside of the housing 200. As shown, in the unlocked position the second inner chamber 320 is accessible through the slits from the right side of the knot tying tool 100 (left side in the embodiment of FIG. 4B).

With the knot tying tool in the unlocked position, a cord 400 may enter the second inner chamber 320 through the first and second slits. Similarly, a cord within the second inner chamber 320 may be removed from the knot tying tool 100 through the first and second slits when in the unlocked position.

FIGS. 5A through 5C show various views of the knot tying tool 100 in a locked position. The knot tying tool 100 may be placed in the locked position by rotating the insert member 300 inside the housing 200. From the unlocked position, the insert member 300 may be rotated such that the second slit 316 of the insert member 300 is no longer aligned with the first slit 212 of the housing 200. The insert member 300 may also be slid into the housing and into the locked position without any rotation. In the locked position, access to the second inner chamber 320 from the side of the knot tying tool 100 is prevented. Similarly, in the locked position, access from the second inner chamber 322 to the outside of the knot tying tool 100 through the side of knot tying tool 100 is prevented. Therefore, once the cord 400 is inside the second inner chamber 320, the cord 400 cannot exit the knot tying tool 100 through the side of the knot tying tool 100 when the knot tying tool is in the locked position.

The knot tying tool 100 may be configured in the locked position with various amounts of rotation of the insert member 300. All that is required is that the first slit 212 does not align with the second slit 316. Therefore, the insert member 300 may be rotated various amounts to achieve the locked position of the knot tying tool 100. For example, the insert member 300 may be rotated 5°, 10°, 15°, 30°, 90°, 180°, etc. to achieve the lock position of the knot tying tool. Other angular amounts may be implemented.

Positioning a cord within the second inner chamber 320 and having the knot tying tool in the locked position can be an initial starting point for many methods of tying a knot with the tool 100. Thus, this may require inserting the insert member 300 into the housing 200, advancing a cord through the aligned side slits and moving the insert member 300 to form the locked position.

Figure 7:
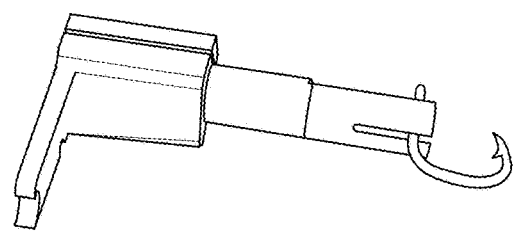
FIGS. 7-7L show a method of tying fishing line to a hook with the knot tying tool of FIGS. 6A-6G.
Figure 7A:
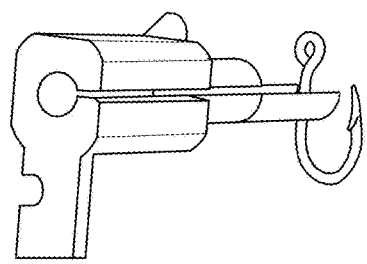
Figure 7B:
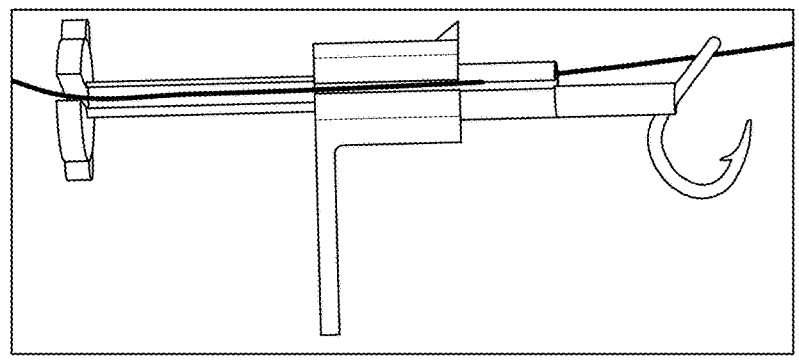
Figure 7C:
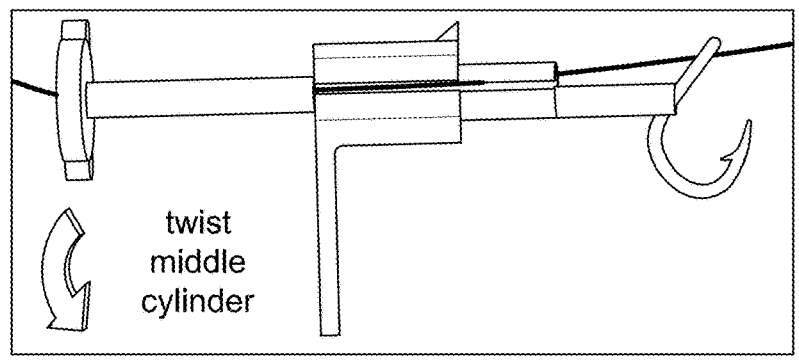
Figure 7D:
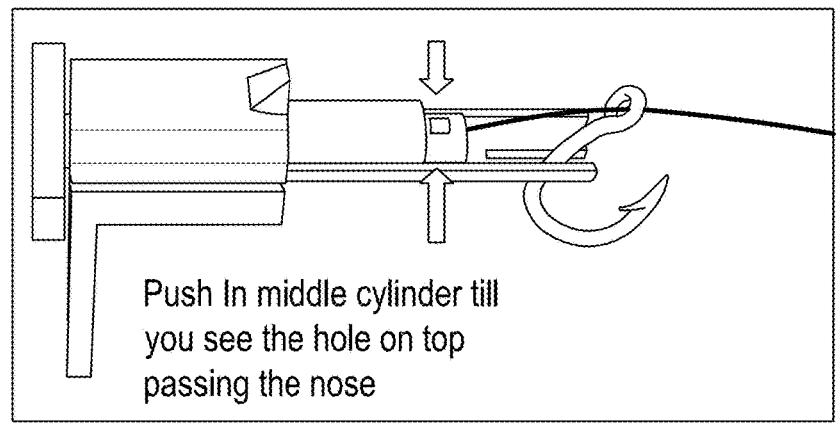
Figure 7E:
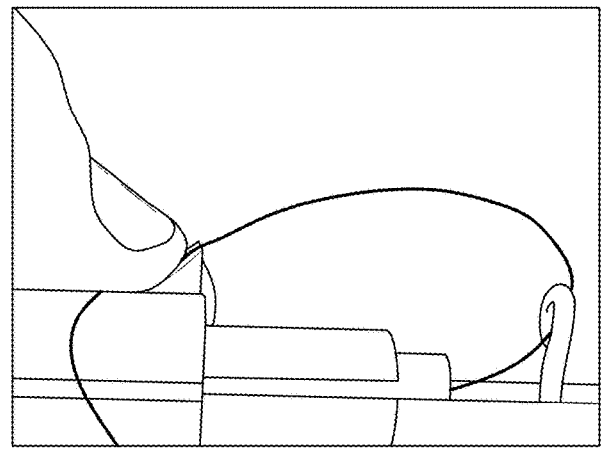
Figure 7F:
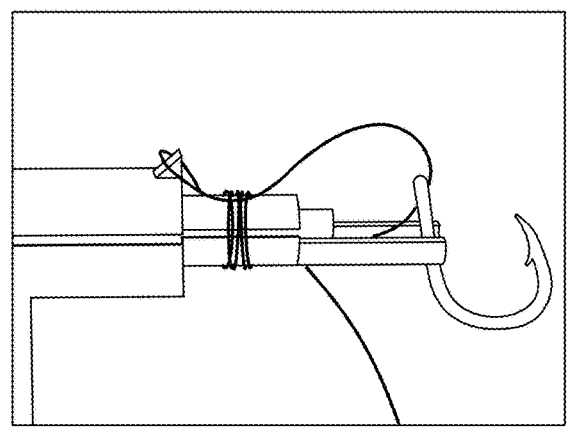
Figure 7G:
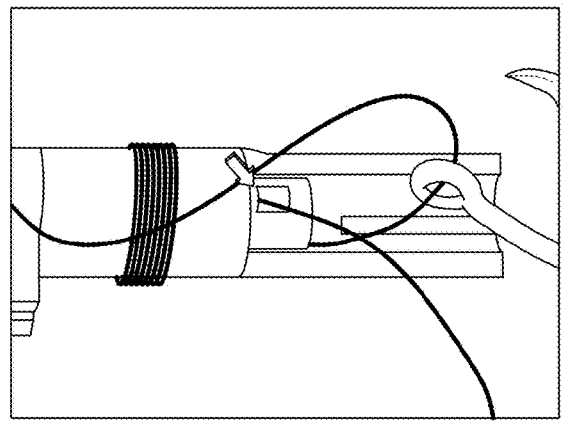
Figure 7H:
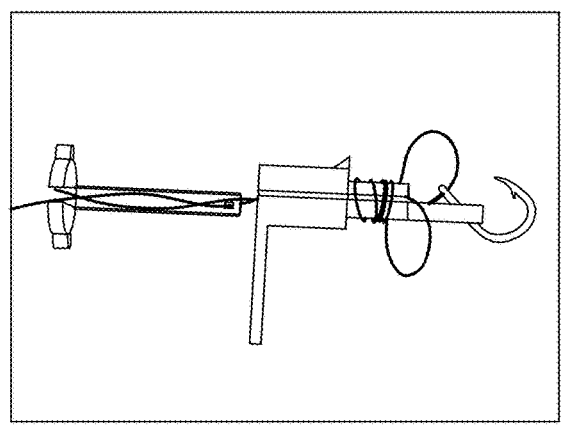
Figure 7I:
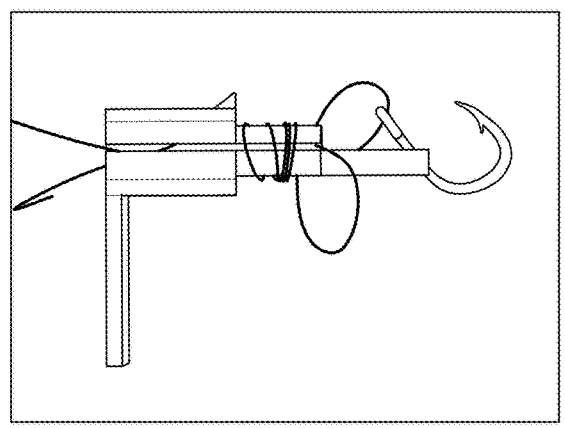
Figure 7J:
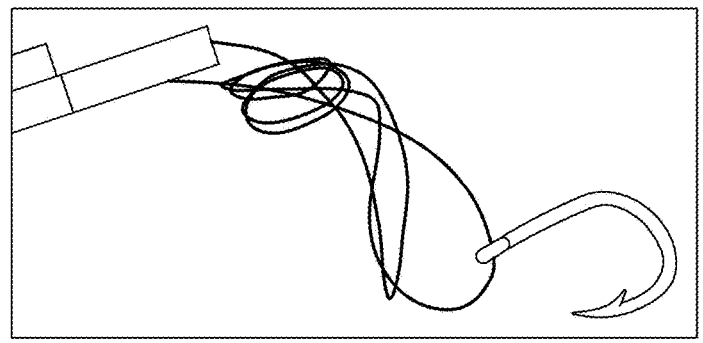
Figure 7K:
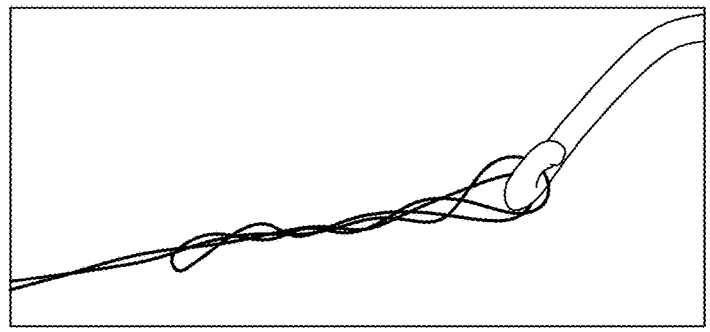
Figure 7L:
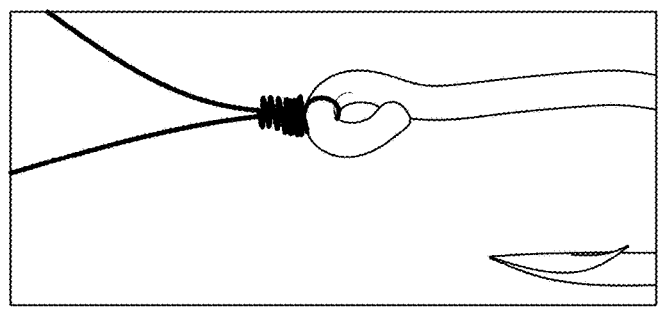

Looking now at FIGS. 6A-6G, another embodiment of knot tying tool is shown. The illustrated knot tying tool is similar to the previously disclosed device. FIGS. 7-7L illustrate a method of tying fishing line to a hook with the knot tying tool of FIG. 6A-6G. The method steps can include the following:

1—Secure the hook to the cut-out on the holder of the housing (FIGS. 7-7A).
2—Insert the line into the knot tying tool so that is within the first and second inner chambers and so that the line also passes through the hole on the hook (FIG. 7B).
3—Secure the line by twisting the inner cylinder placing the tool in the locked position (FIG. 7C).
4—Push in the insert until the opening extends past the second portion (FIG. 7D).
5—Wrap the line from the hook back to the anchor on the first portion of the housing and secure with a finger or thumb (FIG. 7E).
6—Wrap the line around the second portion a minimum of 5 times (FIG. 7F).
7—Advance the end of the line though the opening in the top of the insert member and out through the proximal end of the insert member (FIG. 7G).
8—Pull the insert member at least half way out of the housing (FIG. 7H, 7I).
9—Remove the hook from cut-out and pull line off of housing (FIG. 7J).
10—Remove line and hook completely from tool, pull hook while holding both ends of line to begin to tighten (FIG. 7K).
11—Pull the end of the line away from the main line until tight to form a hook knot (FIG. 7L).

It will be understood that the knot tying tool can be used to form a number of other knots, for different purposes and in different ways.

For example, a method for tying a knot can comprise positioning a line within an inner chamber of an insert member of a knot tying tool; rotating the insert member with respect to a housing of the knot tying tool to move the tool from an unlocked position to a locked position, wherein a first slit on the housing and a second slit on the insert member are aligned in the unlocked position to allow a line to pass through the first and second slits into the inner chamber; wrapping the line around the knot tying tool according to a desired type of knot; separating the insert member from the housing prior to tightening the desired type of knot; and tightening the desired type of knot.

In some embodiments, a method can further include one or more of the following. Threading a distal end of the line through a hole in the insert member and into the inner chamber. Wrapping the line around a protrusion. Wrapping the line multiple times around the housing. Attaching a hook to a holder at an end of the housing. Threading the line through an eyelet of the hook prior to wrapping the line around the knot tying tool.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. In addition, while a number of variations of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. Accordingly, it should be understood that various features and aspects of the disclosed embodiments can be combined with or substituted for one another in order to form varying modes of the disclosed invention. Thus, it is intended that the scope of the present invention herein disclosed should not be limited by the particular disclosed embodiments described above, but should be determined only by a fair reading of the claims that follow.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:
1. A knot tying tool for forming a knot with a line, the knot tying tool comprising:

an elongated housing extending along a longitudinal axis and having a proximal end and a distal end, the housing comprising:
- a first body portion having a first outer cross-section;
- a second body portion adjacent the first body portion and having a second outer cross-section different from the first outer cross-section thereby forming a shoulder between the first body portion and the second body portion;
- a first chamber extending along the longitudinal axis, the first chamber having a proximal opening in the first body portion and a distal opening in the second body portion located distally from the proximal opening along the longitudinal axis;
- a first slit running longitudinally along the housing from the proximal opening to the distal opening; and
- a holder extending from the distal opening of the first chamber, the holder having at least one cut-out at an end of the holder configured for securing a hook or line to the elongated housing; and an insert member comprising:
- an elongate body rotatable and movable within the first chamber;
- a stop member at a proximal end of the elongate body configured to limit translation of the elongate body within the first chamber along the longitudinal axis;
- a second chamber extending through the insert member and configured to receive a line therein, the second chamber having a proximal chamber opening and a distal chamber opening located distally from the proximal chamber opening along the longitudinal axis;
- a hole to provide access through the elongate body to the second chamber, wherein the insert member is sized such that the hole is defined distally of the first chamber's distal opening when the elongate body is positioned within the first chamber of the elongated housing with the stop member engaged with the proximal end of the elongated housing and adjacent the proximal opening of the elongate body; and
- a second slit running longitudinally along the insert member from the proximal chamber opening to the distal chamber opening, wherein rotation of the elongate body within the first chamber moves the knot tying tool between a locked and an unlocked position, the first and second slits being aligned in the unlocked position to allow a line to pass through the first and second slits into the second chamber.

2. The knot tying tool of claim 1, wherein the cut-out on the holder comprises a wedge-shaped cut-out.

3. The knot tying tool of claim 1, wherein the cut-out comprises at least two prongs.

4. The knot tying tool of claim 1, wherein the second outer cross-section is cylindrical and smaller than the first outer cross-section.

5. The knot tying tool of claim 1, wherein the stop member has an outer perimeter larger than an outer perimeter of the elongate body.

6. The knot tying tool of claim 1, wherein the first body portion and second body portion define a single piece.

7. The knot tying tool of claim 1, wherein the stop member is generally planar with a circular outer perimeter.

8. The knot tying tool of claim 1, further comprising one or more protrusions extending from the elongated housing configured for wrapping a line around the protrusion to assist in tying a knot.

9. A knot tying tool for forming a knot with a line, the knot tying tool comprising:
a single piece elongated housing extending along a longitudinal axis and having a proximal end and a distal end, the housing comprising:
- a first body portion having a first outer cross-section;
- a second body portion adjacent the first body portion and having a second outer cross-section different from the first outer cross-section thereby forming a shoulder between the first body portion and the second body portion;
- a cylindrical first chamber extending along the longitudinal axis and having a proximal opening in the first body portion and a distal opening in the second body portion located distally from the proximal opening along the longitudinal axis;
- a first slit running longitudinally along the elongated housing from the proximal opening to the distal opening; and
- a holder extending from the distal opening of the first chamber, the holder having at least one cut-out at an end of the holder configured for securing a hook or line to the elongated housing; and an insert member comprising:
- a cylindrical elongate body rotatable and movable within the first chamber;
- a stop member at a proximal end of the elongate body configured to limit translation of the elongate body within the first chamber along the longitudinal axis;
- a second chamber extending through the insert member and configured to receive a line therein, the second chamber having a proximal chamber opening and a distal chamber opening located distally from the proximal chamber opening along the longitudinal axis;
- an aperture configured to provide access through the elongate body to the second chamber, wherein the insert member is sized such that the aperture is defined distally of the first chamber's distal opening when the elongate body is positioned within the first chamber of the elongated housing with the stop member engaged with the proximal end of the elongated housing and adjacent the proximal opening of the elongate body; and
- a second slit running longitudinally along the insert member from the proximal chamber opening to the distal chamber opening, wherein rotation of the elongate body within the first chamber moves the knot tying tool between a locked and an unlocked position, the first and second slits being aligned in the unlocked position to allow a line to pass through the first and second slits into the second chamber.

10. The knot tying tool of claim 9, wherein the cut-out on the holder comprises a wedge-shaped cut-out.

11. The knot tying tool of claim 9, wherein the cut-out comprises at least two prongs.

12. The knot tying tool of claim 9, wherein the second outer cross-section is cylindrical and smaller than the first outer cross-section.

13. The knot tying tool of claim 9, wherein the stop member has an outer perimeter larger than an outer perimeter of the elongate body.

14. The knot tying tool of claim 9, wherein the stop member is generally planar with a circular outer perimeter.

15. The knot tying tool of claim 9, further comprising one or more protrusions extending from the elongated housing configured for wrapping a line around the protrusion to assist in tying a knot.

16. A knot tying tool for forming a knot with a line, the knot tying tool comprising:
- a single piece elongated housing extending along a longitudinal axis and having a proximal end and a distal end, the housing comprising:
  - a first body portion having a first outer cross-section;
  - a second body portion adjacent the first body portion and having a second outer cross-section that is smaller than the first outer cross-section thereby forming a shoulder between the first body portion and the second body portion;
  - a cylindrical first chamber extending along the longitudinal axis and having a proximal opening in the first body portion and a distal opening in the second body portion located distally from the proximal opening along the longitudinal axis;
  - a first slit running longitudinally along the elongated housing from the proximal opening to the distal opening; and
  - a third body portion adjacent the second body portion and having a third outer cross-section that is smaller than the second outer cross-section, the third body portion extending from the distal opening of the first chamber, the third body portion having at least one cut-out at an end of the third body portion configured for securing a hook or line to the elongated housing; and
- an insert member comprising:
  - a cylindrical elongate body rotatable and movable within the first chamber;
  - a stop member at a proximal end of the elongate body configured to limit translation of the elongate body within the first chamber along the longitudinal axis;
  - a second chamber extending through the insert member and configured to receive a line therein, the second chamber having a proximal chamber opening and a distal chamber opening located distally from the proximal chamber opening along the longitudinal axis;
  - an aperture defined distally of the first chamber's distal opening when the elongate body is positioned within the first chamber of the elongated housing with the stop member engaged with the proximal end of the elongated housing and adjacent the proximal opening of the elongated body, the aperture configured to provide access through the elongate body to the second chamber; and
  - a second slit running longitudinally along the insert member from the proximal chamber opening to the distal chamber opening, wherein rotation of the elongate body within the first chamber moves the knot tying tool between a locked and an unlocked position, the first and second slits being aligned in the unlocked position to allow a line to pass through the first and second slits into the second chamber.

17. The knot tying tool of claim 16, wherein the cut-out on the holder comprises a wedge-shaped cut-out.

18. The knot tying tool of claim 16, wherein the cut-out comprises at least two prongs.

19. The knot tying tool of claim 16, wherein the stop member is generally planar with a circular outer perimeter.

20. The knot tying tool of claim 16, further comprising one or more protrusions extending from the elongated housing configured for wrapping a line around the protrusion to assist in tying a knot.

* * * * *